United States Patent [19]

French et al.

[11] 4,125,041
[45] Nov. 14, 1978

[54] TOOL HOLDER CONSTRUCTION

[76] Inventors: Garland D. French, 44 Maple Hill Dr., Chagrin Falls, Ohio 44022; Thomas J. Davies, 10240 Spinaker Run, Aurora, Ohio 44202

[21] Appl. No.: 803,533

[22] Filed: Jun. 6, 1977

[51] Int. Cl.² .............................................. B23B 29/00
[52] U.S. Cl. ..................................................... 82/36 R
[58] Field of Search ............................. 82/36 R, 36 A

[56] References Cited

U.S. PATENT DOCUMENTS

| | | | |
|---|---|---|---|
| 1,763,479 | 6/1930 | Richardson | 82/36 R |
| 1,822,514 | 9/1931 | Bullard | 82/36 R |
| 2,916,802 | 12/1959 | Blomstrand | 82/36 R |
| 3,380,326 | 4/1968 | Waddy | 82/36 R |
| 3,735,461 | 5/1973 | Andrews, Sr. | 82/36 R |
| 4,018,112 | 4/1977 | Heaton et al. | 82/36 A |

FOREIGN PATENT DOCUMENTS 1,102,523  3/1961  Fed. Rep. of Germany .......... 82/36 R

OTHER PUBLICATIONS

Article–Quick–Change Boring Bar Holder Doubles for Lathe Turret–by Jacob G. Hoffner from American Machinist, Jul. 18, 1946, p. 145.

Primary Examiner—Harrison L. Hinson
Attorney, Agent, or Firm—Frank B. Robb

[57] ABSTRACT

There is disclosed a tool holding construction wherein a tool support such as a turret for an automatic screw machine or the like, is provided and formed with a series of cylindrical openings to receive the shanks of tool members fitting very snugly therein, being normally rotatably adjustable when the machine is being setup by appropriate manipulation, means to clamp said shank being provided, the means themselves being likewise very snugly fitted in the tool support, and the shank hereof being formed to faciliate removal of the tool when rotated to a certain position without requiring the usual extreme measures for such removal.

3 Claims, 7 Drawing Figures

TOOL HOLDER CONSTRUCTION

OBJECTS OF THE INVENTION

It is a principal object of this invention to provide a tool holding construction wherein cylindrical openings are provided in a turret for example of a screw machine or the like, the tool shank being very closely matched in tolerance to the opening, with clamp means provided to maintain the tool in position once it is so positioned, by engagement of the means with the shank of the tool, and by specially forming the shank, facilitate removal of the tool when the same is rotated to a predetermined position for such removal.

It is a further object of this invention to provide a tool holder such as a turrent or the like, in which radial cylindrical openings are provide to support tools having round shanks normally, which shanks fit very snugly in the openings, but are provided with a certain formation on a limited area thereof, which upon rotation of the shank will place that area opposite the clamp member provided, so that withdrawal of the tool may be effected when properly arranged.

Another object of the invention is to provide tool holding construction, wherein the surface of the shank extending longitudinally thereof and said shank being cylindrical, is provided with a relieved area which relieved area can be positioned in the cylindrical opening of a turret, in such a manner as to be opposite the clamping means provided therein and thereby permit removal and emplacement of the tool in position initially to subsequently be adjusted for its operating purposes and thereafter upon appropriate rotation of the tool and specifically the shank thereof, be brought into position for clamp maintenance by means provided and thus carry out its function in the operation of the machine.

A still further object of the invention is to provide a construction of the class described wherein the shank of a tool, is provided with the relieved area mentioned, the clamp bushing in the holder, is of the usual form, and when the shank is rotated to the preferred position for operation of the machine, the clamp bushing may be manipulated to maintain the same, and although release of the clamp bushing would normally prevent direct removal of the shank, rotation of the shank to the relieved area opposite the bushing will permit such removal with a minimum amount of effort.

Other and further objects of the invention will be understood from a consideration of the specification appended hereto and disclosed in the drawings wherein.

DESCRIPTION OF THE INVENTION

Figure 1:
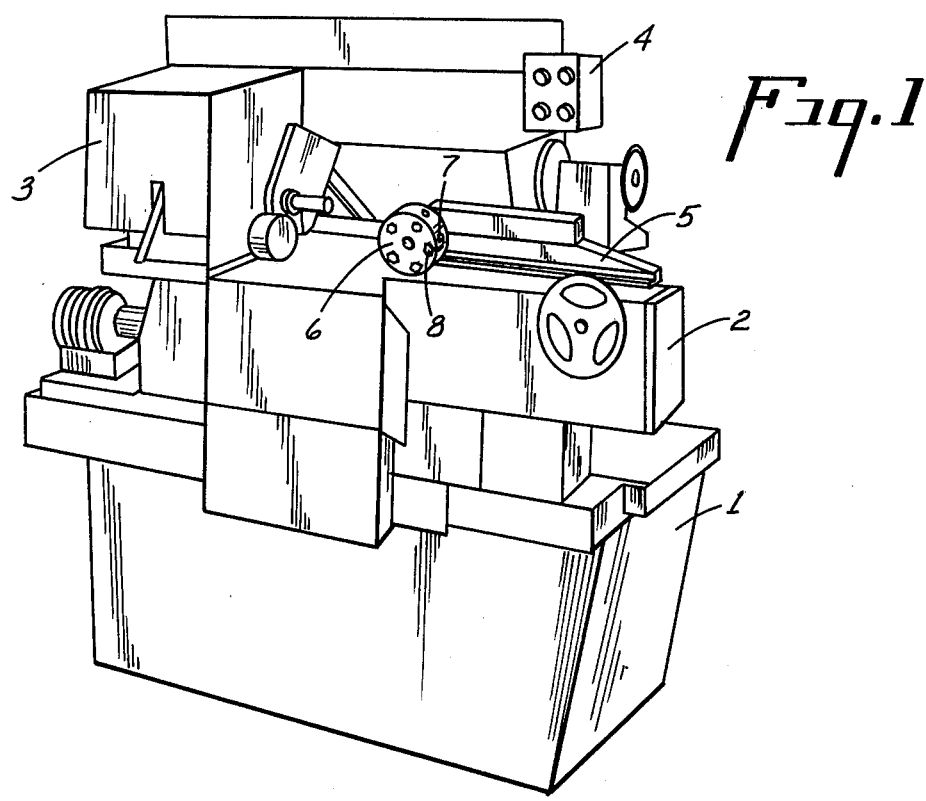
FIG. 1 is a somewhat general view of a screw machine, to illustrate the environment in which the invention hereof is particularly adapted to be used, and specifically the turret of an automatic screw machine in its location in the machine.

Referring to FIG. 1 an automatic screw machine of known type is disclosed in general as providing a base 1 upon which the usual operating elements generally denoted 2 are supported for movements of various kinds the usual power means being provided at 3 and in this case controls for the machine denoted 4.

No reference is made to various other elements than the turret slide hereof designated generally at 5 which supports a turret 6, which in turn is intended to support end working tools, in suitable openings provided therein, the turret in this instance being a generally cylindrical unit with radial openings such as 7 extending inwardly and transverse openings 8 provided for purposes which will be apparent as this description proceeds.

Figure 2:
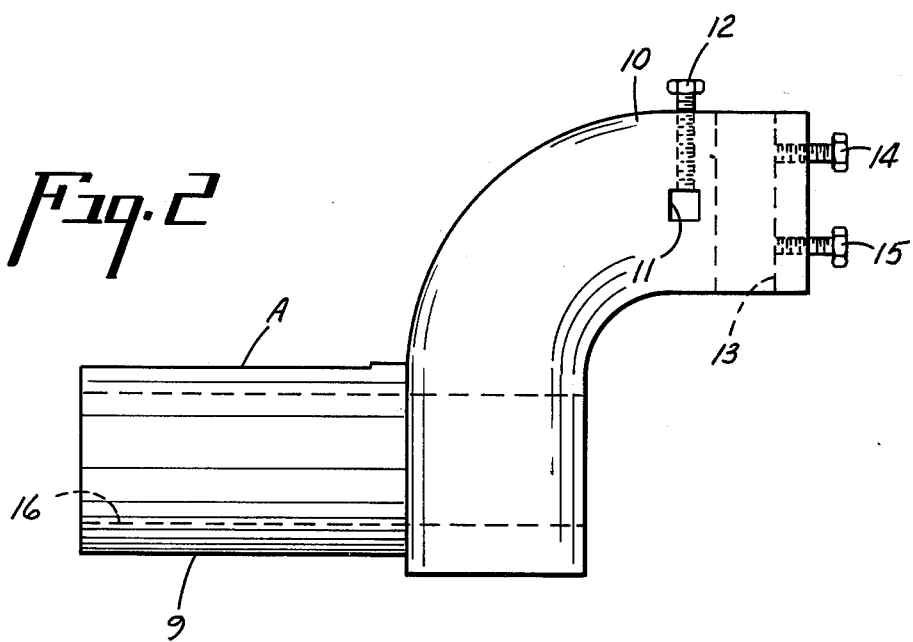
FIG. 2 is a view of a typical tool and the various elements thereof.

Referring to FIG. 2, a typical tool known as a turret tool is provided having the cylindrical shank 9, the shank formed with or connected to a tool bit supporting offset section 10 in which tool bits are carried in openings such as 11 and maintained in position by suitable set screws 12, other openings shown in dotted lines for example denoted 13 provided in which tools are maintaned by such screws as 14 and 15.

The tool shank 9 is usually hollow as suggested with the interior cylindrical opening denoted 16 and the shank wall being of relatively small thickness but siffficiently rigid to maintain the tool in accurate location when in position in the turret 6.

Figures 4, 7:
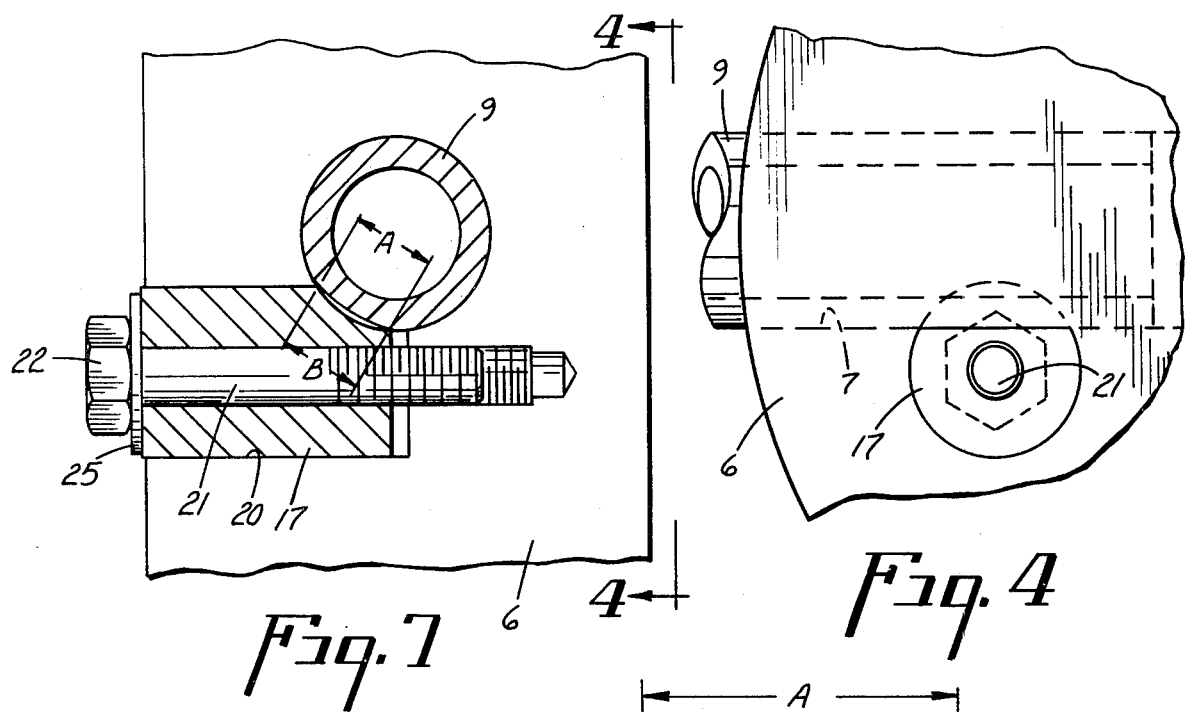
FIG. 4 is a fragmentary view through the turret showing in dotted lines the relative relationship of the shank of the tool and the bushing provided there to maintain said shank in position.
FIG. 7 is a view similar to FIG. 3, illustrating the shank as having been rotated to its removal position or to a position in which the shank can be inserted in the turret.
Figure 3:
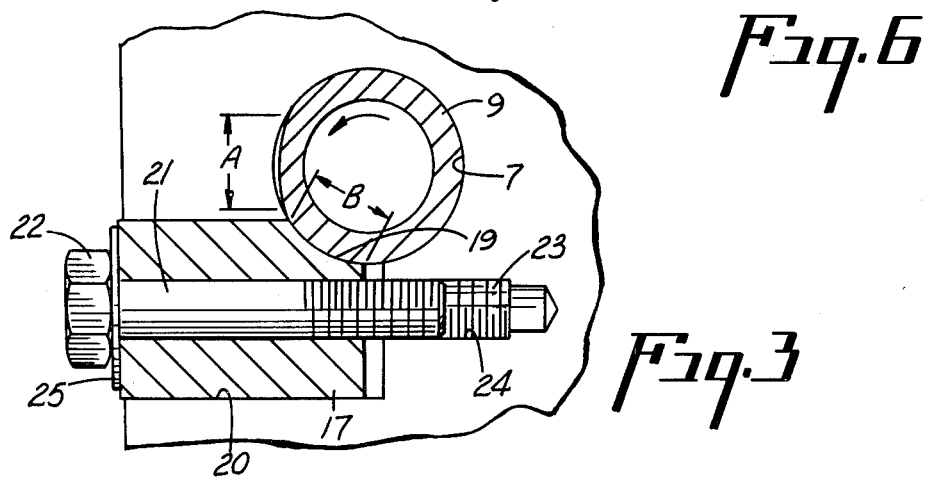
FIG. 3 is a fragmentary sectional view through a turret of the machine, to illustrate the clamp position of the clamp bushing and the engagement thereof with the shank of the tool.

As a matter of fact as will be understood, and reference made to FIGS. 3,4 and 7, the turret 6, and specifically the cylindrical openings such as 7 therein, are arranged so as to receive the shank of a typical tool, the shank being denoted 9 as previously noted with a very close or snug fit so that the tool may be carefully and closely adjusted for its cutting operation in the operation of the machine.

Figures 5, 6:
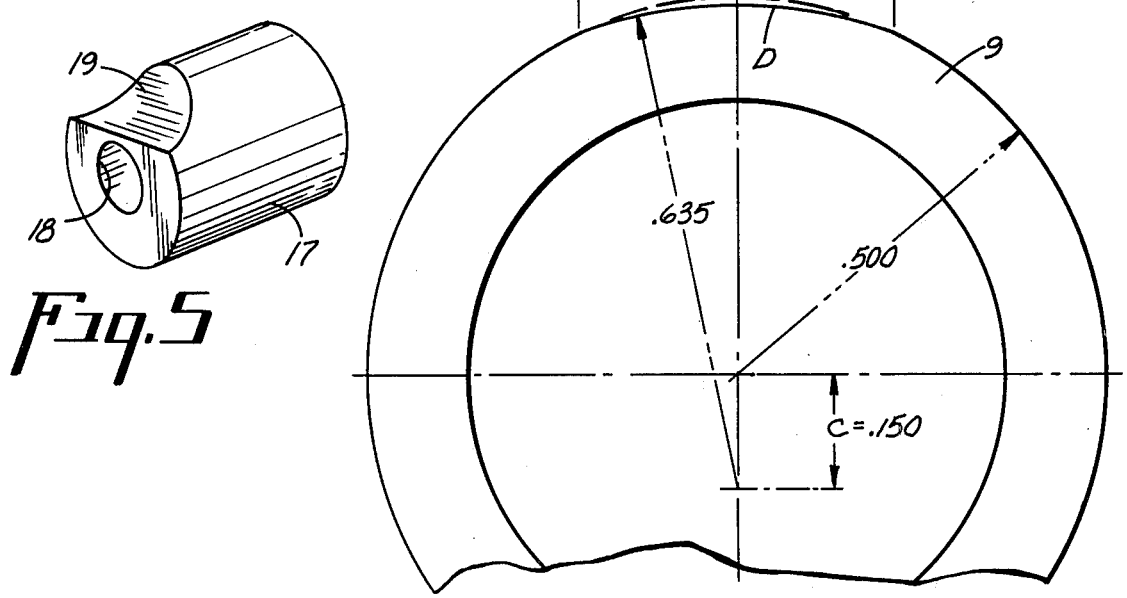
FIG. 5 is a perspective view of the tool clamp bushing.
FIG. 6 is an enlarged view of the end of the shank of the tool to illustrate in greater detail the relieved section.

In order to maintain the shank and of course the tool thereby in the adjusted position desired, a clamp bushing illustrated in perspective in FIG. 5 and denoted 17 is provided, this being a cylindrical member, having a cylindrical opening 18 therethrough, and an arcuate section or arcuate portion 19 formed thereon, which as noted in FIG. 3 for example may be placed in alignment with the cylindrical opening 7 in which the shank of the tool is received.

This bushing 17 is pressed into place in its cylindrical opening 20, formed in the turret or tool holder or tool support 6, so that it will for all intents and purposes normally not be rotatable out of position once pressed into place with the arcuate portion 19, arranged so that it will coact with the surface of the tool shank 9.

In order to maintain the tool and its associated bits in place, the clamp bushing is further provided with a clamp screw 21, with the hex head 22 thereon and the threaded portion 23 at the opposite end, entered in a threaded opening 24 formed in the turret.

A suitable washer 25 is provided under the head 22.

In the normal operation of setting up this turret and only one of the tools is here being described, the shank of the tool is inserted, and is aligned with the arcuate portion 20, because of the preliminary positioning thereof, and thereafter the bolt or clamp screw 21 is manipulated so as to force the bushing 17 toward the right as viewed in FIG. 3.

This will cause a clamping action to be exerted on the shank 9, and maintain the tool in its operating position.

Since the bushing 17 is in fact pressed into place, when it is desired to remove the tool and of course the shank 9 specifically, normally the screw 22 is operated to release the tension thereon, but it is necessary to tap or otherwise hammer the shank 9 out of position in the turret because the press fit of the bushing 17 is such as to continue to maintain normally the engagement of the arcuate section 19 with the surface of the shank.

The invention hereof resides in means to relieve this action, and specifically involves the formation of the shank with an arcuate section as illustrated in FIGS. 6, an end view, which is in effect a relief, the arcuate section being denoted A, and being of an extent which is at least equal to the distance B which corresponds to the chord of the arcuate portion 19 of the bushing 17.

Preferably however, this arcuate relief section A will be of somewhat greater extent than the length B for purposes which will be apparent as this description proceeds.

It will be understood that this arcuate section A is so positioned on the shank 9, that it will permit the location of the bits in the tool in such a manner as to be clamped in position by the bushing 17 for performing the designed operation.

As will be seen in FIG. 3, the section A is rotatively spaced from the clamping position illustrated therein, and therefore the clamping action of the clamp bushing 17 is effected.

When it is desired to remove the tool and specifically the shank 9, reference being made at this point to FIG. 7, the screw 21 is manipulated by the head 22 thereof to relieve the pressure on the clamp bushing 17, but since that bushing is pressed into place it only relieves extreme pressure and not all of the gripping action.

Thus the relieved section A, is availed of and brought into position by rotating the shank 9, into the location shown in FIG. 7 whereby this area or relief section A is in alignment with the area indicated at B in FIG. 3 and specifically the arcuate portion of the clamp bushing 17, and thus the clamping effect is released or relieved.

Thereafter the tool may be removed since the shank 9 is no longer gripped tightly by the bushing 17.

It has been determined that desirably this arcuate section A should be formed by grinding the same to relieve it and this is effectively carried out by offsetting the grinding center radius sufficient amount and in this case indicated at C, in FIG. 6, to actually grind the surface D sufficiently to extend through the distance A as to thereby span the chord B and thus not be affected by the bushing position.

As example of a specific arrangement, it may be assumed that the radius of the shank 9, reference being had to FIG. 6, may be 0.500 inch, and by appropriately offsetting the grinding radius for the relief D, and in this instance C, a distance of 0.150 inch, adopting a radius of 0.635 will provide the desired relief and facilitate the removal of the tool when the shank is appropriately rotated.

It will be understood that similar computations of arcs and radii may be effected for shanks of various different sizes, this one of course being a common size shank and of the preferred radius mentioned.

It should be noted however that the distance A may be provided with relief by flat grinding if the shank is of sufficient thickness and rigidity, but usually in shanks which are hollow and of relatively thin wall, this radius grinding relief will be most preferred.

It is again noted that the position of this relief area or arcuate section A, will necessarily be predetermined by the relationship of the same with the tool holding aspects of the tool in any event, and may be changed to correspond with appropriate changes in the desired location of tool bits supported by the tool.

We claim:

1. In tool holding construction of the class described, in combination, a tool support unit, a tool member having an offstanding shank mounted in said unit, and adapted to be rotatably adjusted to various positions therein, means to effect clamp engagement of said member in such adjusted positions to prevent removal of the member from said unit, comprising a clamp bushing having an arcuate portion to engage the shank, the arc of said portion being of predetermined length, and means on said shank to release said clamp engagement to facilitate such removal in at least one position, said means gripping a portion of the surface of said shank, the surface of the shank is formed with a section at least equal to such length and spaced therefrom when the shank is rotated to bring such section to a position coextensive with said arc after the releaseable means are operated to release said grip to thereby release said clamp engagement.

2. The combination as claimed in claim 1, wherein the shank is cylindrical and formed with an arcuate section as specified, the radius of said section being greater than the radius of the shank whereby rotation of the shank will bring the arc formed thereby interiorly of the cylindrical surface of the shank.

3. The combination as claimed in claim 1, wherein the section is arcuate, the axis of said section being spaced from the axis of the opening and opposite said section.

* * * * *